United States Patent [19]

Yang

[11] Patent Number: 5,554,687

[45] Date of Patent: Sep. 10, 1996

[54] RESINS AND COMPOSITIONS FOR THE MANUFACTURE OF HEAT-RESISTANT HIGH MODULUS MATERIALS, AND MOLDED ARTICLES OBTAINED FROM SUCH MATERIALS

[75] Inventor: Yeong-Show Yang, Lamorlaye, France

[73] Assignee: Cray Valley S.A., Puteaux, France

[21] Appl. No.: 362,416

[22] PCT Filed: Jun. 24, 1993

[86] PCT No.: PCT/FR93/00630

§ 371 Date: Dec. 27, 1994

§ 102(e) Date: Dec. 27, 1994

[87] PCT Pub. No.: WO94/00503

PCT Pub. Date: Jan. 6, 1994

[30] Foreign Application Priority Data

Jun. 26, 1992 [FR] France .................................. 92 07879

[51] Int. Cl.⁶ .................................................. C08G 18/62
[52] U.S. Cl. .......................... 525/63; 252/182.18; 528/73; 528/288; 528/392; 525/123; 525/455; 560/180; 526/312
[58] Field of Search .................... 252/182.18; 528/288, 528/392, 73; 525/63, 455, 123; 560/180; 522/107; 526/312

[56] References Cited

U.S. PATENT DOCUMENTS

| | | | |
|---|---|---|---|
| 4,560,708 | 12/1985 | Horn et al. | 521/137 |
| 4,758,604 | 7/1988 | Barron | 521/125 |
| 4,769,436 | 9/1988 | Beck et al. | 528/75 |
| 4,868,267 | 9/1989 | Bershas et al. | 528/73 |
| 4,880,872 | 11/1989 | Thomas | 525/43 |
| 5,021,544 | 6/1991 | Padget et al. | 528/272 |
| 5,362,799 | 11/1994 | McGarry et al. | 525/31 |

FOREIGN PATENT DOCUMENTS

| | | |
|---|---|---|
| 115072 | 8/1984 | European Pat. Off. . |
| 0115072 | 8/1984 | European Pat. Off. . |
| 143396 | 6/1985 | European Pat. Off. . |
| 273243 | 6/1988 | European Pat. Off. . |
| 8906252 | 7/1989 | WIPO . |

*Primary Examiner*—Rachel Johnson
*Attorney, Agent, or Firm*—Millen, White, Zelano & Branigan, P.C.

[57] ABSTRACT

Composite material produced from a first polyisocyanate-based mixture, from a second mixture comprising at least one ethylenically unsaturated monomer, at least one polyoxyalkylene polyamine and one ethylenically unsaturated polymer, and from a cross-linking catalyst. The first mixture comprises at least one polyisocyanate and at least one catalyst for reacting isocyanate functions with the ethylenically unsaturated polymer of the second mixture, and the second mixture comprises, for 100 parts by weight: 25 to 50 parts by weight of at least one ethylenically unsaturated monomer, 50 to 75 parts by weight of an unsaturated amine polyester resin which is the product of the reaction between (a) an unsaturated polyol polyester prepolymer and (b) a polyoxyalkylene amine, the weight ratio (a)/(b) being at least equal to 0.8, and as much as 4 parts by weight of at least one cross-linking catalyst. Application in the production of high modulus heat-resistant moulded articles.

12 Claims, No Drawings

RESINS AND COMPOSITIONS FOR THE MANUFACTURE OF HEAT-RESISTANT HIGH MODULUS MATERIALS, AND MOLDED ARTICLES OBTAINED FROM SUCH MATERIALS

The present application was filed under the provisions of USC 371 as the US National Phase of PCT application PCT/FR93/00630, filed Jun. 24, 1993.

BACKGROUND OF THE INVENTION

The present Invention relates to new heat-resistant high modulus materials, to compositions used for the manufacture thereof and to finished product parts which may be obtained from such materials Reaction-injection molding is a rapid polymerization process which is commonly used to produce polyurethanes and polyureas having elastomeric to rigid properties. This technology is used in the production of automobile parts, such as bumpers or fenders. In said process, two highly reactive streams of chemical compounds are intermixed under a high pressure, for example about 80 to 200 bars, in a mixing chamber having small dimensions where the streams are directly injected into each other. The mixed material Immediately runs into a mold where the chemical reaction continues and where the molded part is cross-linked. One of the streams contains a polyisocyanate, while the other flow contains a chain extender and a polymer, which has a high molecular weight and is reactive with isocyanate.

High modulus polymers obtained by the reaction-injection molding process can replace steel automobile panels, provided that they can withstand finishing operations on production lines where high temperatures prevail. A composite material is known from U.S. Pat. No. 4,880,872, which material is obtained by such a process from a first mixture of aromatic polyisocyanate and a cross-linking agent and from a second mixture comprising:

a) at least 5% by weight of an ethylenically unsaturated compound containing at least one ethylenically unsaturated monomer, such as styrene, and at least one ethylenically unsaturated polymer, such as a polyester;

b) from 30 to 75% by weight of a polyoxyalkylene polyamine having a molecular weight of between 190 and 3 000, and c) from 5 to 40% by weight of a chain extender selected from the $C_1$–$C_{16}$ aliphatic diamines, $C_6$–$C_{16}$ cycloaliphatic diamines and aromatic diamines, having at least one alkyl substituent in the ortho position of each amine group.

Such a material has a flexural modulus above 700 MPa and up to 1,400 MPa, and an increased resistance to heat, according to the particular measuring method described in the patent mentioned above.

In fact, the composite material described in that document has a number of disadvantages: on the one hand, the flexural modulus obtained is very low in comparison to that which may be obtained in respect of a similar material which does not contain polyoxyalkylene polyamine, as is shown in the comparative Example given below. On the other hand, when the resistance to heat of said material is determined not only by the method particular to said patent, but by the more conventional measurement of the heat distortion temperature, it is noted that said heat distortion temperature does not exceed about 50° C., which is unsatisfactory for many applications of the product.

A technical problem to be overcome by the present invention is, thus, to provide a material which can be obtained in particular by the reaction-injection molding process and which combines, at one and the same time, a high flexural modulus, a high heat distortion temperature and a high impact resistance, a compromise which is not achieved by the teachings of U.S. Pat. No. 4,880,872 nor by the prior art.

On the other hand patent application FR-A-2,667,602 discloses a molding composition based on polyester-polyurethane, characterized in that it comprises a first soft phase of polyurea within a second more rigid phase of polyester-polyurethane formed by the reaction of:

a component A comprising a polyfunctional isocyanate compound and a radical polymerization catalyst, and a component B comprising a mixture (i) of a solution of an ethylenically unsaturated monomer wherein are dissolved about 40 to 90% by weight of an unsaturated polyester-polyol, substantially free from water, comprising at least a dicarboxylic alkene group and having an acid number lower than 5, and (ii) a nitrogenated polyfunctional compound comprising at least two nitrogen atoms in each molecule, which, once reacted with component A, has a molecular weight sufficient for forming the first soft polyurea phase, wherein the ratio of the active NCO groups of the isocyanate to the NH groups of the nitrogenated compound is between about 3:1 and 100:1, the ratio of the active NCO groups to the active OH groups in the polyester-polyol is between about 0.5:1 and about 6:1, in such way that the stoichiometric index NCO: (NH+OH) is between about 0.5 and about 2.0.

SUMMARY OF THE INVENTION

In order to overcome the problems set out above, the present invention proposes a composite material obtained from a first mixture having a polyisocyanate base, a second mixture comprising at least one ethylenically unsaturated monomer, at least one polyoxyalkylene polyamine and an ethylenically unsaturated polymer, and a cross-linking catalyst, characterized in that:

a first mixture comprises at least one polyisocyanate and at least one catalyst for the reaction of the isocyanate functions with the ethylenically unsaturated polymer of the second mixture, and in that the second mixture comprises, per 100 parts by mass:
from about 25 to 50 parts by weight of at least one ethylenically unsaturated monomer,
from about 50 to 75 parts by weight of an aminated unsaturated polyester resin which is the product of the reaction between (a) an unsaturated polyol polyester prepolymer and (b) at least one polyoxyalkylene amine, the weight ratio of (a) to (b) being at least equal to about 0.8, and
up to about 4 parts by weight of at least one cross-linking catalyst.

Optionally, the second mixture may also comprise at least one of the following components:
at least one cross-linking accelerator,
at least one powdery filler,
at least one fibrous reinforcing filler.

The first mixture may optionally also comprise at least one ethylenically unsaturated monomer, which may or may not be identical to that used in the second mixture, but which is preferably miscible therewith.

The composite material according to the invention has a structure different from that of the mold composition of patent FR-A-2.667.602 and contrary to the latter, may be molded with very short molding times, usually not exceeding 5 minutes.

In general, within the scope of the present invention, the term "ethylenically unsaturated monomer" is understood to mean a compound selected from styrene, vinyl toluene, divinyl benzene, acrylic acid esters and methacrylic acid esters, diallyl phthalate, diallyl maleate, diallyl fumarate, triallyl cyanurate, vinyl acetate, vinyl crotonate and vinyl propionate, divinyl ether, conjugated dienes, such as 1,3-butadiene, isoprene, 1,3-pentadiene, 1,4-pentadiene, 1,4-hexadiene, 1,5-hexadiene, 1-9 decadiene, 5-methylene-2-norbornene, 5-vinyl-2-norbornene, 2-alkyl-2,5-norbornadienes, 5-ethylidene-2-norbornene, 5-(2-propenyl)-2-norbornene, 5-(5-hexenyl)-2-norbornene, 1,5 -cyclo-octadiene, bicyclo[2,2,2]octa-2,5-diene, cyclopentadiene, 4,7,8,9-tetra-hydroindene and isopropylidenetetra-hydroindene, and unsaturated nitriles such as acrylonitrile and methacrylonitrile. The esters of acrylic acid and of methacrylic acids which may be used are, for example, alkyl-(meth)acrylates, the alkyl group of which has from about 1 to 8 carbon atoms, as well as polyol(meth)acrylates, such as the diacrylates and dimethacrylates of ethylene glycol, of propylene glycol, of 1,3-butane diol, of 1,4-butane diol, of 1,6-hexane diol, of neopentyl glycol, of 1,4-cyclohexane diol, of 1,4-cyclohexane dimethanol, of 2,2,4-trimethyl-1,3-pentane diol, of 2-ethyl-2-methyl-1,3-propane diol, of 2,2-diethyl-1,3-propane diol, of diethylene glycol, of dipropylene glycol, of triethylene glycol, of tripropylene glycol, of tetraethylene glycol, of tetrapropylene glycol, of trimethylol ethane, of trimethylol propane, of glycerol, of pentaerythritol, the triacrylates and trimethacrylates of trimethylol ethane, of trimethylol propane, of glycerol, of pentaerythritol, the tetraacrylates and tetramethacrylates of pentaerythritol, the di(meth)acrylates to hexa(meth)acrylates of dipentaerythritol, the poly(meth)acrylates of monoethoxylated or polyethoxylated or monoproxylated or polyproxylated polyols, such as the triacrylate and the trimethacrylate of triethoxylated trimethylol propane, of tripropoxylated trimethylol propane; the triacrylate and the trimethacrytate of tripropoxylated glycerol; the triacrylate, the trimethacrylate, the tetra-acrylate and the tetramethacrylate of tetraethoxylated pentaerythritol.

The unsaturated polyol polyester prepolymers (a) are well known and are prepared by reacting polycarboxylic acids or their anhydrides with polyhydric alcohols or with alkylene oxides. They are chiefly linear and generally have a molecular weight of between about 400 and 4000. They may also have lateral chains when polycarboxylic polyols or acids are used which have more than two functional groups. They are preferably prepared from α,β-ethylenic unsaturated dicarboxylic acids such as maleic, fumaric, citraconic, metaconic, itaconic, tetraconic acids, or the like, or, if available, from the corresponding anhydrides and, if required, from saturated acids such as orthophthalic, isophthalic, terephthalic, tetrabromophthalic, tetrachlorophthalic, adipic, sebacic, glutaric, pimelic, succinic and methyl succinic acids or their anhydrides.

When the prepolymers (a) are prepared from maleic anhydride, it is advantageous if their preparation is carried out in the presence of morpholine in order to increase the rate of isomerization of the maleate functions into fumarate functions. The quantity of morpholine used in this case may be up to 1% by weight and is, preferably, between 0.1% and 0.5% by mass of the polyester prepolymer (a).

Generally, the polyhydric alcohols which are used for the preparation of said prepolymers (a) are preferably saturated aliphatic diols such as ethylene glycol, propylene glycol, butylene glycol, diethylene glycol, dipropylene glycol, triethylene glycol, tetraethylene glycol, butanediol, pentanediol, hexanediol and neopentyl glycol. Bisphenol A and its alkoxylated derivatives as well as other aromatic polyols may also be used. The polyester prepolymers (a) can contain terminal hydroxylic or carboxylic groups or they can be terminated by vinyl ester groups, by additional condensation of the resins described above with compounds such as the glycidyl (alkyl) acrylates, the hydroxy alkyl (alkyl) acrylates, vinyl monoacetate or even maleimides.

The preparation of the prepolymer (a) can be carried out in the presence of an effective quantity of at least one cross-linking inhibitor. Examples of cross-linking inhibitors which may be used include, in particular, phenothlazine, hydroquinone methyl ether, N,N-diethyl hydroxyamine, nitrobenzene, di-tert.butyl catechol, hydroquinone, p-anilinophenol, di-(2-ethylhexyl)-octylphenyl phosphite, 2,5-di-tert.butyl- 4-hydroxytoluene, methylene blue, and their mixtures in any proportions. An effective quantity of the cross-linking inhibitor generally ranges between 0.01 and 0.2% by mass of the prepolymer (a).

The polyol polyester prepolymers (a) which can be used in the present Invention have an alcohol index of between about 100 and 450, preferably between about 150 and 350, and an acid index which does not exceed about 10, preferably not exceeding about 5. Their water content must not exceed about 3000 ppm, preferably not exceeding about 1000 ppm.

The polyoxyalkylene amines (b) include, first and foremost, the polyamines which are known, in particular, from U.S. Pat. Nos. 4,296,020 and 3,666,788. They have at least two groups which are reactive with the isocyanate functions and have a molecular weight of between about 200 and 6000. Given by way of example are the compounds having the following formulae:

  (c)

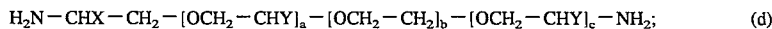  (d)

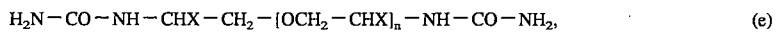  (e)

and

  (f)

wherein X is selected from the hydrogen atom and the alkyl groups having 1 to 18 carbon atoms, A and Y are selected from the alkyl groups having 1 to 10 carbon atoms, n is a number between 2 and 70, b is a number between 8 and 90, a and c are numbers such that their sum total is between 1 and 4, x, y and z are numbers between 2 and 40.

The polyoxyalkylene amines (b) which can be used in the present invention may also be monoamines having only one group which reacts with the isocyanate functions and having a molecular weight of between about 80 and 2100. Given by way of example are the compounds having the formula:

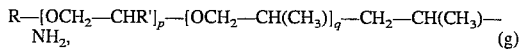 (g)

wherein R is selected from the hydrogen atom and the alkyl groups having 1 to 10 carbon atoms, R' is an alkyl group having 1 to 10 carbon atoms, p and q are numbers between 0 and 40.

The polyisocyanate used in the present invention can be bifunctional, trifunctional and up to hexafunctional. It can be aliphatic, cycloaliphatic and/or aromatic. Mentioned by way of example are, in particular, 4,4'-diphenyl methane diisocyanate, 2,4- and 2,6-toluene diisocyanate, isophorone diisocyanate, tetramethylene diisocyanate, pentamethylene diisocyanate, hexamethylene diisocyanate, 4,4'-dicyclohexyl methane diisocyanate and polymethylene polyphenyl isocyanate. The polyisocyanate may also, in the present invention, be used in the form of polyurea or polyurethane prepolymers having a low molecular weight, i.e. reacting one of the polyisocyanates listed above with a polyamine or a polyol having a low molecular weight. In the last-mentioned case, it is preferable to use an alkylene glycol such as dipropylene glycol, tripropylene glycol, diethylene glycol, triethylene glycol, tetraethylene glycol, neopentyl glycol, 1,2- and 1,3-butylene glycols. In the present Invention, the polyisocyanate may also be used in the form of uretoninine by heating one of the polyisocyanates listed above to an elevated temperature, in the presence of a phosphorus catalyst, so as to form a polycarbodiimide, then reacting the latter with another isocyanate group as described, for example, in U.S. Pat. No. 4,014,935.

The cross-linking catalyst which is present in the second mixture is preferably an organic peroxide, such as benzoyl peroxide, 2,5-dimethyl-2,5-bis (2-ethylhexolperoxy) hexane or methyl ethyl ketone peroxide, a peroxy dicarbonate, a peroxy ester such as tert.butyl peroxybenzoate, tert.butyl peroxyoctoate, tert.amyl peroxyoctoate or 2,5 diperoxyoctoate, or even 2,4-pentanedione peroxide.

The cross-linking accelerators which can be used in combination with the catalyst include, in particular, solutions of alkaline salts or alkaline earth transition metals, such as vanadium, chromium, manganese, iron, cobalt, nickel, copper, zinc, molybdenum and lead, or even amines such as dimethyl aniline or N,N-dimethyl paratoluidine.

As the catalyst for the reaction of the isocyanate functions with the aminated unsaturated polyester resin, the following may be mentioned:

(a) tertiary amines such as bis (dimethyl amino ethyl) ether, trimethyl amine, triethyl amine, N-methyl morpholine, N-ethyl morpholine. N,N-dimethyl benzylamine, N,N-dimethyl ethanol amine, N,N,N',N'-tetramethyl-1,3-butane diamine, triethylanol amine, 1,4diazabicyclo[2.2.2.]octane and pyridine oxide, (b) tertiary phosphines such as trialkyl phosphines and dialkyl benzyl phosphines, (c) strong bases such as the hydroxides, alcoholates and phenolates of alkali metals and alkaline earth metals.

(d) metal salts of strong acids such as ferric chloride: stannic chloride, stannous chloride and bismuth chloride, antimony trichloride and bismuth nitrate, (d) chelates, such as those which can be obtained from acetyl acetone, benzoyl acetone, trifluoroacetyl acetone, ethyl acetoacetate, salicylaidehyde, cyclopentanone-2-carboxylate, acetyl acetoimine, bis-acetyl acetone alkylene diimines, salicylaidehyde imine, and from metals such as beryllium, magnesium, zinc, cadmium, lead, titanium, zirconium, tin, arsenic, bismuth, chromium, molybdenum, manganese, iron, cobalt and nickel, (f) alcholates and phenolates of metals, such as $Ti(OR)_4$, $Sn(OR)_4$, $Sn(OR)_2$ and $Al(OR)_3$, in which R is an alkyl or aryl group, (g) the salts of organic acids and of metals, such as alkali metals and alkaline earth metals, aluminum, tin, lead, manganese, cobalt, nickel and copper, for example sodium acetate, potassium laurate, calcium hexanoate, stannous acetate, stannous octoate and stannous oleate, lead octoate, manganese and cobalt napthenates, and (h) iron and cobalt metal carbonyls and organometallic derivatives of tetravalent tin, of trivalent and pentavalent arsenic, of antimony and of bismuth; particularly preferred are the salts of dialkyl tin carboxylic acids, such as dibutyl tin diacetate, dibutyl tin dilaurate, dibutyl tin maleate, dilauryl tin diacetate, dioctyl tin diacetate, dibutyl tin bis (4-methylamino benzoate), dibutyl tin bis (6-methylamino caproate), trialkyl tin hydroxides, dialkyl tin oxides, dialkyl tin dialcoxides and dialkyl tin dichlorides.

Said catalyst is generally used at a rate of 0.01 to 2% by mass of the polyisocyanate which is present in the first mixture.

For the formation of the aminated unsaturated polyester resin which is present in the second mixture, the prepolymer (a) and the polyoxyalkylene amine (b) are preferably used in a weight ratio of (a)/(b) which does not exceed about 50.

In order to obtain, according to the objectives of the present invention, the expected performances of the composite material, the first mixture and the second mixture are brought together in proportions such that the molar ratio of the isocyanate functions to the hydroxyl functions is between about 0.8 and 1,2, preferably between 0.95 and 1.05. Once brought together, the first and second mixtures form, by means of a reaction between the isocyanate functions and the hydroxyl functions of the aminated unsaturated polyester resin, a new single polymer and not, as in the teachings of U.S. Pat. No. 4 880 872, a mixture of two substantially independent polymers, the first being a vinyl copolymer and the second a polyurea.

The powdery fillers which may be incorporated in the second mixture are, in particular, calcium carbonate, alumina hydrate, kaolin, talc, in a proportion up to about 70% by mass relative to the second mixture, or even up to about 50% by weight relative to the composite material.

The fibrous reinforcing fillers which can be incorporated in the second mixture are, in particular, glass fibres, either in the form of crushed fibres, at a rate of up to about 35% by weight relative to the second mixture, or even up to about 25% by weight of the composite material, or in the form of a glass mat, at a rate of up to about 70% by weight of the composite material.

In order to obtain the composite material according to the invention, the first mixture is brought together with the second mixture at a temperature, preferably, of between about 20° and 50° C., and the resultant mixture is then brought to a temperature, preferably, of between about 20° and 150° C., for an adequate duration so as to cause the cross-linking by the ethylenically unsaturated monomer. Upon completion of this stage, the cross-linked material can, in addition, also be subjected to a post cross-linking phase at a temperature, preferably, of between about 100° and 180° C., for a period, preferably, of between 10 and 120 minutes.

The production of the composite material according to the invention can take place in a mold, either by the reaction-injection molding procedure, as described above, or by the resin transfer molding technique. It may also be carried out according to the following techniques:

casting (preparation of a resin concrete), contact process (with the aid of a brush or a roller), simultaneous projection with the aid of a spray gun which is, optionally, provided with a glass cutter, filament winding.

A further object of the present invention are molded articles obtained by the preparation of the composite material in a mold. Said articles are characterized by a heat distortion temperature of at least 65° C. and, preferably, of at least 80° C., by a flexural modulus of at least 2000 MPa, and by an unnotched Charpy impact resistance of at least 45 KJ/m$^2$. Preferably, when their heat distortion temperature is between 65° and 80° C. their resistance to the non-notched Charpy impact test is at least 70 KJ/m$^2$.

A further object of the present invention is a composition for the manufacture of composite materials and molded articles such as described above and comprising, per 100 parts by weight:

from about 25 to 50 parts by weight of at least one ethylenically unsaturated monomer, from about 50 to 75 parts by weight of an aminated unsaturated polyester resin which is the product of the reaction between (a) an unsaturated polyol polyester prepolymer and (b) a polyoxyalkylene amine, the mass ratio of (a)/(b) being at least about 0.8, and up to about 4 parts by weight of at least one cross-linking catalyst.

Finally, a last object of the present invention includes, by way of intermediate product in the production of the compositions, composite materials and molded articles described above, comprising an aminated unsaturated polyester resin obtained by a reaction between (a) an unsaturated polyol polyester prepolymer and (b) a polyoxyalkylene amine, the weight ratio of (a)/(b) being at least about 0.8. The unsaturated monomer, the unsaturated polyol polyester prepolymer, the polyoxyalkylene amine and the cross-linking catalyst which are used in said composition and/or in said intermediate product have already been described in detail above.

Alternatively, said composition may also comprise at least one of the following components:

at least one cross-linking accelerator, at least one powdery filler, and at least one fibrous reinforcing filler, as described in detail above.

The Examples given below are provided by way of non-limiting illustration of the present invention.

EXAMPLE 1 (COMPARATIVE)

The following are introduced into a reactor and are mixed until homogeneous:

31.39 parts by mass of a polypropylene oxide triamine having a molecular weight of 3000, marketed by TEXACO under the trade name JEFFAMINE T-3000, 9.26 parts by mass of 1,3,5-triethyl-2,6 diamino benzene, 17.05 parts by mass of styrene, and 14.48 parts by weight of a polypropylene glycol maleate polyester resin.

The resultant mixture is then transferred to the container of component B of a reaction-injection molding machine according to U.S. Pat. No. 4,189,070, where its temperature is maintained at 60° C.

In a similar manner, the following are mixed in a reactor: 26.84 parts by weight of a liquid prepolymer of 4,4'-diphenyl methane diisocyanate modified by a glycol, marketed by the RUBICON CHEMICAL company under the trade name RUBINATE LF-179, and 0.99 parts by mass of tert.butyl-peroxy-2-hexylhexanoate, marketed by the AKZO company under the trade name TRIGONOX 21 S, as the cross-linking agent, and the resultant mixture is transferred to the container of component A of the above-mentioned molding machine, where its temperature is maintained at 40° C.

The components A and B are then injected under a pressure of 100 bars into a steal mold having the dimensions of 12×22×0.3 cm, which is preheated to 100° C. The molded part is removed from the mold at the end of 5 minutes and is then subjected to a post cross-linking step in a furnace for 1 hour at 140° C. After cooling to the ambient temperature, the following properties were measured on the molded part:

flexural modulus: 960 MPa tensile breaking stress: 18 MPa heat distortion temperature: 48° C.

resistance to unnotched Charpy impact test:

cannot be measured (specimen is too flexible).

EXAMPLE 2

The following are introduced into a reactor: 225 parts by weight of maleic anhydride, 145 parts by weight of neopentyl glycol, 105 parts by weight of propylene glycol, 195 parts by weight of diethylene glycol, 3.3 parts by weight of morpholine, and 0.2 parts by weight of hydroquinone. The reactor, which is maintained at a low nitrogen flow, is heated to 75° C. in order to obtain the fusion of the two solid components. Subsequently, the agitator is activated, and the reactor is heated to 220° C. and maintained at that temperature for 7 hours. The end of the reaction is accelerated by activating a vacuum pump, and the reaction is terminated when the acid number of the resin falls below 5. The analysis of the final product shows that 97% of the maleate functions have been isomerized into fumarate functions.

EXAMPLES 3 to 15

The unsaturated polyester resin prepared according to Example 2 is coded from its preparation temperature (220° C.) to the temperature $T_1$, indicated in Table I below, then $x_1$ parts by mass of polyoxyalkylene polyamine are added to the reactor for 100 parts of polyester resin, and the Michael reaction is permitted to continue for the duration t (expressed in minutes) indicated in Table I below. Upon completion of the Michael reaction, the analysis of the aminated unsaturated polyester resin shows an isomerization in fumarate residues of at least 99%. The polyoxyalkylene polyamines used are marketed by the TEXACO company under the trade mark JEFFAMINE and carry the following references:

D-400 for Examples 3 to 5

T-403 for Example 6

D-230 for Example 7

BD-600 for Example 8

BD-605 for Example 9

D-2000 for Example 10

T-3000 for Examples 11 to 13

D-4000 for Example 14, and

T-5000 for Example 15

TABLE I

| Example | 3 | 4 | 5 | 6 | 7 | 8 | 9 | 10 | 11 | 12 | 13 | 14 | 15 |
|---|---|---|---|---|---|---|---|---|---|---|---|---|---|
| $x_1$ | 5.3 | 8.5 | 11.1 | 6.0 | 4.4 | 11.1 | 11.1 | 56.8 | 11.1 | 56.8 | 56.8 | 11.1 | 94.7 |
| $T_1$ | 120 | 120 | 180 | 120 | 120 | 120 | 120 | 120 | 120 | 120 | 50 | 120 | 120 |
| t | 30 | 30 | 20 | 30 | 30 | 30 | 30 | 30 | 30 | 30 | 60 | 30 | 30 |

EXAMPLES 16 to 32

As a first step, a first mixture is prepared, said mixture comprising Y, parts by weight of diphenyl methylene diisocyanate marketed by DOW CHEMICAL under the reference M 143, and $Y_2$ parts by weight of benzoyl peroxide marketed by AKZO under the trade name LUCIDOL CH.50. On the other hand, a second mixture is prepared, said mixture comprising $x_2$ parts by weight of unsaturated resin obtained according to one of the preceding Examples (said Example is identified in Table II below under the heading "resin ex"), 100-$x_2$ parts by weight of styrene, 0.4 parts by weight of the weight of dibutyl tin dilaurate marketed by ALDRICH, and W parts by weight of dimethyl aniline. The two mixtures thus prepared are then simultaneously introduced into the same reactor and rapidly mixed at the ambient temperature. The mixture obtained is transferred immediately to a square mold having a temperature of 90° C. (with the exception of Example 19: 60° C.) and maintained there for 1 minute (with the exception of Example 19: 3 minutes), whereupon it is subjected to a post-cross-linking step at 180° C. for 15 minutes. In addition to the values $Y_1$, $Y_2$, $x_2$ and W, and the nature of the aminated unsaturated polyester resin, Table II below indicates, for each Example, the values of the following properties measured on the molded material:

- tensile strength MT, expressed in MPa and determined according to the NFT 51-034 standard,
- tensile breaking stress RR, expressed in MPa and determined according to the NFT 51-034 standard.
- elongation at rupture AR, expressed in % and determined according to the NFT 51-034 standard.
- resistance to the unnotched Charpy impact test RC, expressed in kJ/m² and determined according to the NFT 51-035 standard.
- heat distortion temperature HDT, expressed in degrees Celsius and determined according to the NFT ISO 75 standard.

Example 16 uses a non-aminated unsaturated polyester resin and is given as a comparative example.

TABLE II

| Example | 16 | 17 | 18 | 19 | 20 | 21 | 22 | 23 |
|---|---|---|---|---|---|---|---|---|
| $Y_1$ | 53.7 | 64.2 | 62.5 | 62.5 | 62.5 | 53.7 | 60.8 | 63.7 |
| $Y_2$ | 1.0 | 1.4 | 1.2 | 1.2 | 0.6 | 0.6 | 1.2 | 1.4 |
| $x_2$ | 58 | 67.5 | 67.5 | 67.5 | 67.5 | 58 | 67.5 | 67.5 |
| W | 0.2 | 0.2 | 0.2 | 0.2 | 0 | 0 | 0.2 | 0.2 |
| resin ex | 2 | 3 | 4 | 4 | 4 | 4 | 5 | 6 |
| MT | 3300 | 3000 | 3100 | 3100 | 3200 | 3300 | 3300 | 3100 |
| RR | 65 | 79 | 81 | 80 | 83 | 85 | 80 | 88 |
| AR | 3.3 | 5.2 | 7.1 | 6.5 | 5.5 | 2.5 | 5.4 | 7.9 |
| RC | 35 | 46 | 52 | 50 | 51 | 45 | 53 | 49 |
| HDT | 122 | 110 | 105 | 110 | 110 | 120 | 100 | 112 |

TABLE II-continued

| Example | 24 | 25 | 26 | 27 | 28 | 29 | 30 | 31 | 32 |
|---|---|---|---|---|---|---|---|---|---|
| $Y_1$ | 64.7 | 60.8 | 60.8 | 60.8 | 43.1 | 43.1 | 60.8 | 31.5 | 43.1 |
| $Y_2$ | 1.4 | 1.2 | 1.2 | 1.2 | 1.0 | 1.0 | 1.2 | 0.9 | 1.0 |
| $x_2$ | 67.5 | 67.5 | 67.5 | 67.5 | 74.4 | 74.4 | 67.5 | 78.3 | 74.4 |
| W | 0.2 | 0.2 | 0.2 | 0.2 | 0.2 | 0.2 | 0.2 | 0.2 | 0.2 |
| resin ex | 7 | 8 | 9 | 11 | 12 | 13 | 14 | 15 | 10 |
| MT | 3200 | 300 | 3100 | 3100 | 2300 | 2600 | 2900 | n.d | 2400 |
| RR | 79 | 75 | 79 | 84 | n.d. | n.d. | 79 | n.d. | n.d. |
| AR | 4,9 | 4,2 | 5,0 | 5,3 | 9,6 | 8,4 | 6,0 | 10,5 | 8,6 |
| RC | 45 | 48 | 47 | 47 | 54 | 63 | 55 | 100 | 54 |
| HDT | 105 | 112 | 110 | 109 | 91 | 88 | 111 | 75 | 92 | n.d = not determined

EXAMPLE 33

A further unsaturated polyester resin is prepared according to the process of Example 2, by introducing into the reactor 294 parts by weight of maleic anhydride, 296 parts by weight of isophthalic acid, 312 parts by weight of neopentyl glycol, 229 parts by weight of propylene glycol, 424 parts by weight of diethylene glycol and 0.05 part by weight of hydroquinone. The analysis of the final product shows that 77% of the maleate functions have been isomerized into fumarate functions.

EXAMPLE 34

A further unsaturated polyester resin is prepared according to the process of Example 33, but 3.3 parts by weight of morpholine is introduced into the reactor from the moment when the reaction commences. The analysis of the final product shows that 97% of the maleate functions have been isomerized into fumarate functions.

EXAMPLES 35 to 38

On the basis of the resins of Examples 33 and 34, aminated unsaturated polyester resins are prepared according to the process of Examples 3 to 15. The polyoxyalkylene polyamines used are:

JEFFAMINE D-400 for Examples 35 to 37, and
JEFFAMINE T-3000 for Example 38.
For each Example, $T_1$=120° C. and t=30 minutes.
Table III below indicates the value of x1, for each Example, as well as the nature of the original polyester resin.

TABLE III

| Example | 35 | 36 | 37 | 38 |
|---|---|---|---|---|
| x1 | 8.5 | 8.5 | 2.6 | 11.1 |
| resin | ex 33 | ex 34 | ex 34 | ex 34 |

EXAMPLES 39 to 42

Following the procedure of Example 16, composite materials are prepared and their resistance to the unnotched Charpy impact test RC and the heat distortion temperature HDT are measured, as previously described. Table IV below indicates, in respect of each Example, in addition to the value of $Y_1$ and the nature of the aminated unsaturated polyester resin, the values of the properties measured.

In all the Examples, $Y_2=1$; $x_2=61$; $Z=0,4$ and $W=0,2$.

TABLE IV

| Example | $Y_1$ | resin ex | RC | HDT |
|---|---|---|---|---|
| 39 | 50.2 | 35 | 83 | 85 |
| 40 | 50.2 | 36 | 85 | 85 |
| 41 | 53.1 | 37 | 71 | 90 |
| 42 | 50.2 | 38 | 70 | 90 |

In addition, in respect of the material of Example 42, MT=3100 MPa, RR=80 MPa and AR=7,4%.

EXAMPLE 43

A further unsaturated polyester resin is prepared according to the process of Example 2, by introducing into the reactor 348 parts by weight of fumaric acid, 296 parts by weight of isophthalic acid, 312 parts by mass of neopentyl glycol, 229 parts by weight of propylene glycol, 424 parts by weight of diethylene glycol and 0.05 part of hydroquinone.

EXAMPLES 44 to 47

On the basis of the resin of Example 43, aminated unsaturated polyester resins are produced according to the process of Examples 3 to 15. The polyoxyalkylene polyamines used are:

JEFFAMINE D-400 for Examples 44 and 45, and
JEFFAMINE T-3000 for Examples 46 and 47.
For each Example, T1=180° C. and t=30 minutes.

The Table below indicates the value of $x_1$. Following the process of Example 16, composite materials are then prepared and their resistance to the unnotched Charpy impact test RC and the heat distortion temperature HDT are then measured as previously described. Table V below indicates, for each Example, in addition to the quantities $Y_1$ of polyisocyanate M 143, and $Y_2$ of TRIGONOX 21 S, the values of the properties measured. In all these Examples, $x_2=61$, $Z=0,4$ and $W=0$. In addition, in respect of the material of Example 46, MT=3100 MPa, RR=81 MPa and AR=7.5%.

TABLE V

| Example | $x_1$ | $Y_1$ | $Y_2$ | RC | HDT |
|---|---|---|---|---|---|
| 44 | 8.5 | 51.4 | 1.0 | 82 | 85 |
| 45 | 11.1 | 50.2 | 1.0 | 86 | 83 |
| 46 | 11.1 | 50.2 | 1.0 | 68 | 90 |
| 47 | 56.8 | 35.6 | 0.7 | 100 | 70 |

I claim:

1. A composite material obtained from a first mixture based on polyisocyanate, a second mixture comprising at a least one ethylenically unsaturated monomer, at least one polyoxyalkylene polyamine and an ethylenically unsaturated polymer, and a cross-linking catalyst, wherein;

the first mixture comprises at least one polyisocyanate and at least one catalyst for the reaction between the polyisocyanate and the ethylenically unsaturated polymer of the second mixture, and in that the second mixture comprises, per 100 parts by weight:
from 25 to 50 parts by weight of at least one ethylenically unsaturated monomer,
from 50 to 75 parts by weight of an aminated unsaturated polyester resin which is the product of the reaction between (a) an unsaturated polyol polyester prepolymer and (b) a polyoxyalkylene amine, the weight ratio of (a)/(b) being at least 0.8 and not exceeding about 50, and
up to 4 parts by weight of at least one cross-linking catalyst.

2. A composite material according to claim 1, wherein the polyoxyalkylene amine is selected from monoamines having a molecular weight of between 80 and 2100 or polyamines having a molecular weight of between 200 and 6000.

3. A composite material according to claim 1, wherein the second mixture also comprises at least one cross-linking accelerator.

4. A composite material according to claim 1, wherein the second mixture also comprises at least one powdery filler.

5. A composite material according to claim 1, wherein the second mixture also comprises at least one fibrous reinforcing filler.

6. A process for obtaining a composite material according to claim 1, wherein the first mixture is brought together with the second mixture and the resultant mixture is then brought to a temperature of between 30 and 150° C. and for a sufficient length of time so as to bring about the cross-linking of the ethylenically unsaturated monomer.

7. A substantially water-free composition for the manufacture of composite materials consisting essentially of, per 100 parts by weight:
from 25 to 50 parts by weight of at least one ethylenically unsaturated monomer,
from 50 to 75 parts by weight of an aminated unsaturated polyester resin which is the product of a reaction between (a) an unsaturated polyol polyester prepolymer and (b) a polyoxyalkylene amine, the weight ratio of (a)/(b) being at least 0.8 and not exceeding about 50, and
up to 4 parts by weight of at least one crosslinking catalyst, said prepolymer having an alcohol index of between about 100 to 450, an acid index not exceeding 10 and a water content not exceeding about 3000 ppm.

8. Molded articles obtained by preparing a composite material according to claim 1 in a mold having a heat distortion temperature of at least 65° C., a flexural modulus of at least 2000 MPa, and by a resistance to the unnotched Charpy Impact test of at least 45 kJ/m².

9. A composite material according to claim 1, wherein the polyoxyalkylene amine comprises a compound of the formula:

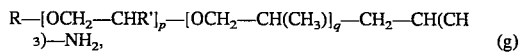

$$R\text{—}[OCH_2\text{—}CHR']_p\text{—}[OCH_2\text{—}CH(CH_3)]_q\text{—}CH_2\text{—}CH(CH_3)\text{—}NH_2, \quad (g)$$

wherein R is a hydrogen atom or an alkyl group having 1 to 10 carbon atoms, R' is an alkyl group having 1 to 10 carbon atoms, and p and q are numbers between 0 and 40.

10. A composite material according to claim 1 wherein the polyoxyalkylene amine is:

$$H_2N-CHX-CH_2-[OCH_2-CHX]_n-NH_2] \quad (c)$$

$$H_2N-CHX-CH_2-[OCH_2-CHY]_a-[OCH_2-CH_2]_b-[OCH_2-CHY]_c-NH_2; \quad (d)$$

$$H_2N-CO-NH-CHX-CH_2-[OCH_2-CHX]_n-NH-CO-NH_2, \quad (e)$$

or

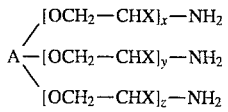 (f)

wherein X is a hydrogen atom or an alkyl group having 1 to 18 carbon atoms, A and Y are alkyl groups having 1 to 10 carbon atoms, n is a number between 2 and 70, b is a number between 8 and 90, a and c are numbers such that their sum total is between 1 and 4, x, y and z are numbers between 2 and 40.

11. A process according to claim 6, wherein the mixtures are first brought together at 20°–50° before raising the resultant mixture to between 30° and 150° C.

12. A composition of claim 7, said polymer having a water content not exceeding about 1000 ppm.

* * * * *